United States Patent
Yoshikawa et al.

(10) Patent No.: US 12,486,090 B2
(45) Date of Patent: Dec. 2, 2025

(54) LAYERED BODY FOR PACKAGING

(71) Applicant: TOYO SEIKAN GROUP HOLDINGS, LTD., Tokyo (JP)

(72) Inventors: Seishi Yoshikawa, Yokohama (JP); Koki Shibata, Yokohama (JP); Atsushi Ebata, Yokohama (JP); Kenya Majima, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 375 days.

(21) Appl. No.: 18/025,516

(22) PCT Filed: Sep. 10, 2021

(86) PCT No.: PCT/JP2021/033240
§ 371 (c)(1),
(2) Date: Mar. 9, 2023

(87) PCT Pub. No.: WO2022/054891
PCT Pub. Date: Mar. 17, 2022

(65) Prior Publication Data
US 2024/0010404 A1    Jan. 11, 2024

(30) Foreign Application Priority Data
Sep. 11, 2020 (JP) .................. 2020-153224

(51) Int. Cl.
*B65D 65/40* (2006.01)
*B32B 7/12* (2006.01)
(Continued)

(52) U.S. Cl.
CPC .............. *B65D 65/40* (2013.01); *B32B 7/12* (2013.01); *B32B 27/08* (2013.01); *B32B 27/32* (2013.01);
(Continued)

(58) Field of Classification Search
CPC .......... B65D 65/40; B32B 7/12; B32B 27/08; B32B 27/32; B32B 2250/02;
(Continued)

(56) References Cited

U.S. PATENT DOCUMENTS

| | | | |
|---|---|---|---|
| 2011/0086220 A1* | 4/2011 | Yoshida | B32B 27/34 428/317.5 |
| 2015/0059295 A1* | 3/2015 | Honda | C08G 59/44 53/473 |

(Continued)

FOREIGN PATENT DOCUMENTS

| | | |
|---|---|---|
| CN | 107848680 A | 3/2018 |
| EP | 2 361 841 A1 | 8/2011 |

(Continued)

OTHER PUBLICATIONS

English machine translation for JP2006-161033 (Year: 2006).*
(Continued)

*Primary Examiner* — Michael C Miggins
(74) *Attorney, Agent, or Firm* — Sughrue Mion, PLLC

(57) ABSTRACT

The layered body for packaging of the present invention includes a barrier film (1) having an inorganic coating (1*b*) formed on the surface of a thermoplastic resin film (1*a*), and an adhesive layer 3 provided on the inorganic coating (1*b*). The adhesive layer (3) is formed of an epoxy-based adhesive.

15 Claims, 1 Drawing Sheet

(51) Int. Cl.
　　*B32B 27/08*　　(2006.01)
　　*B32B 27/32*　　(2006.01)
(52) U.S. Cl.
　　CPC ..... *B32B 2250/02* (2013.01); *B32B 2250/242* (2013.01); *B32B 2255/10* (2013.01); *B32B 2255/20* (2013.01); *B32B 2553/00* (2013.01)
(58) Field of Classification Search
　　CPC .......... B32B 2250/242; B32B 2255/10; B32B 2255/20; B32B 2553/00; B32B 2307/7244; B32B 2250/24; B32B 2439/46; B32B 2270/00; B32B 2307/31; B32B 2307/514; B32B 2307/54; B32B 27/18; B32B 27/306; B32B 27/34; B32B 2255/26
　　See application file for complete search history.

(56) References Cited

U.S. PATENT DOCUMENTS

| | | |
|---|---|---|
| 2018/0147814 A1 | 5/2018 | Sato et al. |
| 2019/0193904 A1 | 6/2019 | Toyoshima et al. |

FOREIGN PATENT DOCUMENTS

| | | |
|---|---|---|
| JP | 2006-161033 A | 6/2006 |
| JP | 4117461 B2 | 7/2008 |
| JP | 2012-76288 A | 4/2012 |
| JP | 2013-249070 A | 12/2013 |
| JP | 2016-064610 A | 4/2016 |
| JP | 2016-175654 A | 10/2016 |
| JP | 2020-037187 A | 3/2020 |
| WO | 2013/161481 A1 | 10/2013 |
| WO | 2017/002753 A1 | 1/2017 |

OTHER PUBLICATIONS

English machine translation for JP2016-064610 (Year: 2016).*
Extended European Search Report dated Jul. 26, 2024, issued in European Application No. 21866848.1.
International Search Report for PCT/JP2021/033240 dated Nov. 16, 2021 (PCT/ISA/210).
Communication dated Apr. 11, 2025 issued by the State Intellectual Property Office of the P.R. China in application No. 202180061851.5.

* cited by examiner

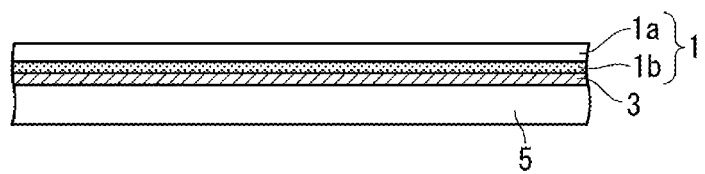

LAYERED BODY FOR PACKAGING

CROSS REFERENCE TO RELATED APPLICATIONS

This application is a National Stage of International Application No. PCT/JP2021/033240 filed Sep. 10, 2021, claiming priority based on Japanese Patent Application No. 2020-153224 filed Sep. 11, 2020.

TECHNICAL FIELD

The present invention relates to a layered body for packaging, and more particularly to a layered body for packaging that exhibits excellent oxygen barrier properties.

BACKGROUND ART

Resin films represented by polypropylene films and olefin resin films such as polyethylene have been widely used as packaging materials for many years because they are inexpensive and can be easily bonded by heat sealing to form a pouch.

Since such a resin film is inferior in gas barrier properties, forming an inorganic coating on the surface of the resin film is known as means for improving the gas barrier properties, and providing a vapor-deposited film of aluminum, silicon oxide, or the like, a coating film mainly composed of silicon oxide, a coating film formed by a crosslinking reaction between a carboxylic acid and a metal, a coating film in which a metal oxide is dispersed, or the like is known. Furthermore, providing the above-described coating film on the above-described vapor-deposited film is known. A resin film having such an inorganic coating on the surface thereof exhibits high gas barrier properties and is therefore commercially available as a barrier film.

When a pouch is produced using the above-described barrier film, a heat-sealing resin layer is usually provided. Such a heat-sealing resin layer is bonded to the barrier film using an adhesive.

For example, Patent Document 1 discloses a layered body for packaging including a substrate film having the vapor-deposited film and the heat-sealing resin layer provided on the vapor-deposited film via an adhesive layer, wherein the adhesive layer is formed of a cured product of a two-part curable adhesive containing a polyester polyol, an isocyanate compound, and a phosphoric acid-modified compound.

Note that the adhesive layer is provided for bonding layers formed of different materials, and the heat-sealing resin layer is provided for joining the same kind of resin (heat-sealing resin), and is different from the adhesive layer.

However, a pouch obtained by bag making using this layered body for packaging ensures sufficient oxygen barrier properties unless retort sterilization is performed, but when retort sterilization is performed, the oxygen barrier properties are greatly decreased. Therefore, it is difficult to use such a layered body for packaging as a pouch for retort foods. The decrease in oxygen barrier properties after the retort sterilization is considered to be caused by the shrinkage of the substrate film and the generation of defects in a vapor-deposited layer due to heating during the retort sterilization. Such a decrease in oxygen barrier properties due to heating occurs not only when the vapor-deposited film is formed but also when other inorganic coatings are provided. Therefore, there is a need to ensure excellent oxygen barrier properties by the inorganic coating even after retort sterilization.

Patent Document 2 discloses a gas barrier polyolefin laminated film having a polyolefin film layer and a gas barrier layer. In this laminated film, the gas barrier layer is a film layer obtained by curing an epoxy resin containing an aromatic ring in the molecule with an epoxy resin curing agent, and exhibits excellent oxygen barrier properties. However, since the gas barrier layer does not have an inorganic coating such as a vapor-deposited film, oxygen barrier properties as high as those of a barrier film having an inorganic coating are not obtained regardless of the presence of retort sterilization.

CITATION LIST

Patent Literature

Patent Document 1: JP 2020-37187 A
Patent Document 2: JP 4117461 B

SUMMARY OF INVENTION

Technical Problem

Accordingly, an object of the present invention is to provide a layered body for packaging that exhibits excellent oxygen barrier properties even when subjected to heat treatment such as retort sterilization.

Solution to Problem

According to the present invention, there is provided a layered body for packaging including a barrier film having an inorganic coating formed on a surface of a thermoplastic resin film, and an adhesive layer provided on the inorganic coating, wherein the adhesive layer is formed of an epoxy-based adhesive.

In the layered body for packaging of the present invention, the following aspects are preferably applied.
 (1) In the layered body for packaging according to claim 1, storage elastic modulus of the adhesive layer is higher than 39 MPa at 120° C.
 (2) The epoxy-based adhesive contains an epoxy resin and an amine-based curing agent, and the adhesive layer is formed by curing the epoxy resin with the amine-based curing agent.
 (3) A heat-sealing resin layer is layered on the adhesive layer.
 (4) The heat-sealing resin layer is formed of a propylene-based resin composition, and the propylene-based resin composition contains an impact polypropylene component (A) in which an ethylene-propylene copolymer is dispersed in polypropylene and a linear low-density polyethylene (B).
 (5) The propylene-based resin composition has a xylene soluble fraction derived from the ethylene-propylene copolymer in a range of 8% by mass or more.
 (6) The linear low-density polyethylene (B) contains methylpentene as a copolymer.
 (7) The thermoplastic resin film is an oriented polypropylene film.
 (8) A strength reinforcing layer formed of a stretched film containing at least one selected from an olefin-based resin, a polyamide-based resin, and an ethylene-vinyl alcohol copolymer is provided, in addition to the thermoplastic resin film.
 (9) The stretched film forming the strength reinforcing layer is formed of polypropylene.
 (10) The inorganic coating is a vapor-deposited film.

According to the present invention, there is further provided a pouch obtained by bonding the above-described layered body for packaging by heat sealing.

The pouch preferably contains an olefin-based resin at a ratio of 80% by mass or more.

According to the present invention, there is further provided a layered body for packaging including a barrier film having an inorganic coating formed on a surface of a thermoplastic resin film in which an adhesive layer is provided on the inorganic coating, wherein the adhesive layer has a storage elastic modulus higher than 39 MPa at 120° C.

Advantageous Effects of Invention

The layered body for packaging of the present invention has a basic structure including a barrier film having an inorganic coating and a heat-sealing resin layer, and has an important feature in that the adhesive layer provided between the barrier film (inorganic coating) and the heat-sealing resin layer is formed of an epoxy-based adhesive, whereby excellent oxygen barrier properties can be obtained even after retorting.

As a result of many experiments, it has been confirmed as a phenomenon that excellent oxygen barrier properties can be obtained even after retorting by forming the adhesive layer with an epoxy-based adhesive, and the exact reason has not been elucidated yet. However, the present inventors presume that one of the reasons is that the adhesive layer formed of an epoxy-based adhesive exhibits a large storage elastic modulus at a high temperature, particularly at 120° C.

For example, as shown in Example 1 described later, when the adhesive layer formed between a heat-sealable film and the inorganic coating is formed of an epoxy-based adhesive, the storage elastic modulus thereof is as high as 57 MPa (at 120° C.), and when the layered body is made into pouches (filled with water as content), the oxygen permeability before retorting is 0.05 cc/m$^2$/day/atm and after retorting is 1.75 cc/m$^2$/day/atm, which is slightly higher. On the other hand, as in Comparative Example 1, the storage elastic modulus of the adhesive layer formed of a urethane-based adhesive is 2.4 MPa (at 120° C.), which is considerably lower than that of the adhesive layer of Example 1 formed of an epoxy-based adhesive. It is understood that such a pouch obtained by forming the layered body of Comparative Example 1 not only exhibits an oxygen permeability of 1.04 cc/m$^2$/day/atm before retorting, which is slightly higher than that of Example 1, but also exhibits a significantly increased oxygen permeability of 12.54 cc/m2/day/atm after retorting. Similarly, the storage elastic modulus of the adhesive layer of Comparative Example 3 formed of a urethane-based adhesive of a type different from that of Comparative Example 1 is 39 MPa (at 120° C.), which is higher than that of the adhesive layer of Comparative Example 1, but still lower than that of the adhesive layer of Example 1 formed of an epoxy-based adhesive. The pouch obtained from such a layered body of Comparative Example 3 shows a significant increase in oxygen permeability of 11.58 cc/m$^2$/day/atm after retorting.

That is, the adhesive layer formed of an epoxy-based adhesive has a large storage elastic modulus at 120° C., for example, larger than 39 MPa.

That is, as shown in the experiments of Examples to be described later, a layered body of a barrier film having an inorganic coating such as a vapor-deposited film and the adhesive layer has a high thermal shrinkage ratio and shrinks significantly when heated in a retort treatment. However, since the adhesive layer formed of an epoxy-based adhesive has a high storage elastic modulus at a high temperature, the thermal shrinkage of the layered body of the barrier film and the adhesive layer is considered to be suppressed, and the occurrence of cracks and pinholes in the inorganic coating due to the shrinkage is considered to be effectively suppressed.

As described above, the layered body for packaging of the present invention exhibits excellent oxygen barrier properties not only before retorting but also after retorting, and thus is suitably used as a pouch for retort food.

BRIEF DESCRIPTION OF DRAWINGS

The FIGURE is a schematic cross-sectional side view illustrating the basic structure of the layered body for packaging of the present invention.

DESCRIPTION OF EMBODIMENTS

Layer Structure of Layered Body for Packaging

As illustrated in the FIGURE, the layered body for packaging of the present invention has a basic structure in which an adhesive layer 3 is formed on a barrier film 1, and, for example, a heat-sealing resin layer 5 is adhered on the adhesive layer 3.

In such a basic structure, the barrier film 1 has an inorganic coating 1b formed on a thermoplastic resin film 1a, and a heat-sealing film is bonded onto the inorganic coating 1b of the barrier film 1 with an adhesive to form, for example, a heat-sealing resin layer 5 via the adhesive layer 3.

Barrier Film 1

Thermoplastic Resin Film 1a;

In the barrier film 1, the thermoplastic resin film 1a serves as a base of the inorganic coating 1b, and is produced by a known means such as extrusion or co-extrusion molding.

Such thermoplastic resins are not limited in principle, and various thermoplastic resins can be used including olefin-based resins including, for example, polyolefins such as low-density polyethylene, high-density polyethylene, medium density polyethylene, polypropylene, poly(1-butene); poly(4-methyl-1-pentene), or random or block copolymers of α-olefins such as ethylene, propylene, 1-butene, and 4-methyl-1-pentene, and cyclic olefin copolymers.

In addition to the above-described olefin-based resins, the following resins can be used for forming the thermoplastic resin film 1a.

Ethylene-vinyl compound copolymers such as ethylene-vinyl acetate copolymer, ethylene-vinyl alcohol copolymer, and ethylene-vinyl chloride copolymer;

Styrene-based resins such as polystyrene, acrylonitrile-styrene copolymer, ABS, and α-methylstyrene-styrene copolymer;

Polyvinyl-based resins such as polyvinyl chloride, polyvinylidene chloride, vinyl chloride-vinylidene chloride copolymer, polymethylacrylate, and polymethyl methacrylate;

Polyamides such as nylon 6, nylon 6-6, nylon 6-10, nylon 11, and nylon 12;

Thermoplastic polyesters such as polyethylene terephthalate (PET), polybutylene terephthalate, and polyethylene naphthalate (PEN);

Other resins such as polycarbonate, polyphenylene oxide, polyimide resin, polyamideimide resin, polyetherimide resin, fluorine resin, allyl resin, polyurethane resin, cellulose resin, polysulfone resin, polyethersulfone resin, ketone resin, amino resin, and polylactic acid.

In addition, the thermoplastic resin film 1a may be a blend of the resins exemplified above, or a resin obtained by appropriately modifying any of these resins by copolymerization (for example, an acid-modified olefin-based resin).

In the layered body for packaging of the present invention, the thermoplastic resin film 1a is preferably an olefin-based resin film from the viewpoint of being used for forming retort pouches having high recyclability, and is more preferably polypropylene from the viewpoint of strength of pouches and the like.

In addition, the thermoplastic resin film 1a is preferably stretched in one or two axial directions from the viewpoint of having sufficient heat resistance to withstand retort sterilization. The stretching ratio may be such that film breakage due to overstretching does not occur, and is usually 2 times or more.

The thermoplastic resin film 1a described above may have an appropriate thickness according to the capacity of the pouch to be finally manufactured or the like, but if it is excessively thin, the strength may be reduced due to loss of orientation or the like when forming the inorganic coating 1b described later. Therefore, the thermoplastic resin film 1a preferably has a thickness of at least 10 μm or more.

Inorganic Coating 1b;

The inorganic coating 1b provided on the thermoplastic resin film 1a described above is provided to ensure oxygen barrier properties, and examples thereof include vapor-deposited films of various metals or metallic oxides, silicon-oxide-based coating films, coating films formed by cross-linking reaction between carboxylic acids and metals, and coating films in which metallic oxides are dispersed. Further, the coating film may be provided on the vapor-deposited film described above.

In the present invention, the formed film is dense and high-oxygen barrier properties can be obtained, and thus the inorganic coating 1b is preferably a coating in which a silicon-oxide-based coating film is provided on a vapor-deposited film.

The vapor-deposited film is an inorganic vapor-deposited film formed by techniques such as physical vapor deposition represented by sputtering, vacuum vapor deposition, ion plating, or the like, and chemical vapor deposition typified by plasma CVD, or the like, which is a film formed of various metals or metal oxides, for example. Since such a vapor-deposited film is formed of an inorganic substance, it exhibits higher oxygen barrier properties against a gas barrier resin such as an ethylene-vinyl alcohol copolymer.

In the present invention, from the viewpoint of ensuring particularly high oxygen barrier properties, a vapor-deposited film formed of silicon oxide or aluminum oxide, especially silicon oxide, exhibits the highest barrier properties against oxygen, and thus is most suitable.

In addition, the thickness of the inorganic coating 1b described above varies depending on the level of oxygen barrier properties required, while in the case of the vapor-deposited film, the inorganic coating 1b should be thick enough to ensure an oxygen permeability of not more than 1 cc/m$^2$/day/atm without impairing the properties of the underlying thermoplastic resin film 1a upon vapor deposition, and the thickness may be generally from about 1000 to 10 nm, particularly from about 100 to 10 nm.

Adhesive Layer 3

The adhesive layer 3 is formed of an epoxy-based adhesive. The adhesive layer 3 formed in this manner is a layer exhibiting adhesiveness and, at the same time, exhibiting a large storage elastic modulus as described above, where, for example, the storage elastic modulus at 120° C. is larger than 39 MPa (at 120° C.), particularly 45 MPa or more. That is, since the adhesive layer 3 formed of an epoxy-based adhesive exhibits a large storage elastic modulus at 120° C., it is possible to effectively avoid a decrease in oxygen barrier properties when a heat treatment at a temperature of from about 100 to 120° C. such as retort sterilization is performed.

The above-described epoxy-based adhesive is a so-called dry laminate adhesive, and is used for adhering by curing a liquid epoxy resin with an epoxy curing agent. A layer such as the heat-sealing resin layer 5 is adhered and fixed on the inorganic coating 1b by the adhesive layer 3 formed by using the epoxy-based adhesive.

The epoxy resin described above is a liquid resin having an epoxy group in the molecule, and typical examples thereof include those obtained by reaction of epichlorohydrin with a phenol compound, an amine compound, a carboxylic acid or the like, and those obtained by oxidation of an unsaturated compound such as butadiene with an organic peroxide or the like, and any type of epoxy resin can be used.

Specific examples thereof include, but are not limited to, bisphenol A type or bisphenol F type epoxy resins, novolac type epoxy resins, cyclic aliphatic type epoxy resins, long chain aliphatic type epoxy resins, glycidyl ester type epoxy resins, glycidyl amine type epoxy resins, and the like.

In the present invention, a glycidylamine type epoxy resin is particularly preferable in that an adhesive layer having a high elastic modulus can be formed.

Furthermore, as the epoxy curing agent, a known epoxy curing agent such as an amine-based curing agent, an acid anhydride, or a polyamide can be used. In particular, from the viewpoint of forming a coating film (adhesive layer) having a high elastic modulus and easily following thermal shrinkage, an amine-based curing agent, particularly an aromatic polyamine typified by metaphenylene diamine is suitably used.

The amount ratio between the epoxy resin and the curing agent may be set so that a sufficient cured film is formed according to the epoxy equivalent weight of the epoxy resin.

The epoxy-based adhesive described above is applied onto the above-described inorganic coating 1b using volatile organic solvents such as hydrocarbons, alcohols, ketones, esters, and ethers, and dried to form the adhesive layer 3 on the inorganic coating 1b.

Note that, as a result of many laboratory tests, it has been found that, for effectively avoiding the deterioration of the oxygen barrier properties when heat treatment such as retort sterilization is performed, the high storage elastic modulus at 120° C. exhibited by the adhesive layer 3 is obtained only by the epoxy-based resin at present, and the high storage elastic modulus cannot be obtained by the urethane-based adhesive. However, even other adhesives are considered to be capable of effectively avoiding the deterioration of the oxygen barrier properties when heat treatment such as retort sterilization is performed as long as they exhibit a high storage elastic modulus at 120° C. as in the present invention.

Heat-Sealing Resin Layer 5

The heat-sealing resin layer 5 is formed by superposing and pressure-bonding the heat-sealing film on the adhesive layer 3 described above and curing the adhesive in this state. That is, since the resin layer 5 is easily melted by heating and is immediately solidified by cooling, the layered body can be thermally adhered to various objects by using this, and a pouch can be produced by thermally adhering (heat-sealing) such layered bodies to each other.

Note that curing of the adhesive is performed by holding the adhesive at a temperature of about 30 to 50° C. for 24 hours or more.

In the present invention, films formed of various thermoplastic resins can be used as the heat-sealing film used for forming the above-described heat-sealing resin layer 5; however, a film formed of an olefin resin is preferable in terms of cost and the like, and a CPP film (non-oriented polypropylene film, also referred to as cast PP film) is preferably used because it is necessary to ensure heat resistance and impact resistance particularly in terms of use for producing a pouch subjected to retort treatment, and a CPP film formed of impact polypropylene (impact PP) is most preferably used particularly in terms of ensuring excellent impact resistance and heat resistance.

The CPP film using the above-described impact PP is molded by melt extrusion of a propylene-based resin composition, and the propylene resin composition contains an impact PP component (A) and a linear low-density polyethylene (B).

Impact PP Component (A);

The impact PP component (A) is formed of impact polypropylene (impact PP), and the impact PP used in the present invention has a structure in which an ethylene-propylene copolymer (EPR) is dispersed especially in a homo- or random polypropylene. That is, the dispersion of the EPR in the polypropylene imparts impact resistance to the polypropylene. A known rubber component dispersed in the polypropylene includes, in addition to EPR, a styrene-butadiene copolymer (SBR), and an ethylene-propylene-butene copolymer (EPBR). Although components other than EPR can improve the impact resistance, EPR is most suitable in that it can also improve the impact resistance at low temperatures.

The impact PP as described above has a melt flow rate (MFR, 230° C.) in a range approximately from 0.5 to 10 g/10 min from a viewpoint of, for example, film formability (extrusion formability).

The EPR content in the above-described impact PP can be represented by a xylene soluble fraction when the CPP film used for forming the heat-sealing resin layer 5 is dissolved in boiling xylene, and the xylene soluble fraction is preferably 8% by mass or more, particularly in the range from 8 to 20% by mass. That is, when the xylene soluble fraction is smaller than the above range, the impact resistance of the pouch declines because the amount of EPR is small. On the other hand, when the soluble fraction is excessively high, the appearance of the pouch may be poor.

Linear Low-Density Polyethylene (B);

This linear low-density polyethylene (LLDPE) is a component that functions as a compatibilizer between the polypropylene (PP) and the ethylene-propylene copolymer (EPR) when mixed with the impact PP described above and greatly improves dispersion of EPR in PP, thereby allowing EPR to sufficiently exhibit its impact improving effect.

Such LLDPE is a linear low-density polyethylene having a density in the range from 0.860 to 0.925 g/cm$^3$, and is obtained by copolymerizing ethylene with an α-olefin such as butene-1, hexene-1,4-methylpentene-1 or octene-1, and is obtained by introducing a short-chain α-olefin chain as a branch into a long-chain ethylene chain to reduce the density, and has extremely high molecular linearity.

In addition, since this LLDPE is used by being mixed with impact PP, in order to not impair film formability, LLDPE having an MFR (190° C.) from 1.0 to 15 g/10 min is suitably used, and as comonomer components, hexene-1 and 4-methylpentene-1 (methylpentene) are preferable, and methylpentene is most preferable.

In addition, this LLDPE preferably contains α-olefin as a comonomer in an amount of 10 mol % or less and has a number average molecular weight of 10000 or more measured by GPC calibrated with polystyrene. That is, when the content of the α-olefin as a comonomer is large or when the number average molecular weight is small and the low molecular weight component is contained in a large amount, when used as a pouch, the oil resistance and the flavor property imparted to the contents deteriorate.

The composition of the film is preferably designed so that the amount of LLDPE (B) described above in the CPP film (corresponding to the amount of LLDPE in the heat-sealing resin layer 5) is 20% by mass or less. That is, if the content of LLDPE is excessive, the blocking resistance and heat resistance of the film may be impaired.

Note that, in the propylene-based resin composition used for forming the CPP film, a known additive may be blended in an amount within a range that does not impair recyclability.

The CPP film including the impact PP component described above is produced by dry-blending components and feeding them to an extruder to melt-knead them, melt-extruding the blend into a film shape from a T-die, and bringing the extruded film-shaped melt into contact with a cooling roll to solidify the melt and a solidified film is wound.

The thickness of such a CPP film is not particularly limited but typically is in a range from 20 to 100 μm and, in particular, preferably from 50 to 80 μm in consideration of rigidity, openability, and the like.

In the layered body for packaging of the present invention obtained by laminating the above-described layers or films, for example, a printed layer or a transparent protective layer (PET film) may be layered on the outer surface side of the barrier film 1.

Other Layers

In the present invention, when the above-described stretched film of polypropylene is used as the thermoplastic resin film 1a serving as a base of the inorganic coating 1b, a stretched film layer containing at least one selected from an olefin-based resin, a polyamide-based resin, and an ethylene-vinyl alcohol copolymer is preferably provided as a strength reinforcing layer on the outer surface of the stretched film (thermoplastic resin film 1a) or between the inorganic coating 1b and the adhesive layer 3. That is, such a strength reinforcing layer is different from the thermoplastic resin film 1a (a film serving as a base of the inorganic coating 1b) in the barrier film 1, and serves to mitigate the loss of orientation due to heat treatment such as heat sealing treatment and to effectively suppress a decrease in strength.

Such a strength reinforcing layer is a stretched molding of a blend or a layered product of an olefin-based resin and a reinforcing resin having a melting point higher than that of the olefin-based resin. In particular, a stretched film of a blend of an olefin-based resin and a polyamide-based resin or an ethylene-vinyl alcohol copolymer is preferable, and the mass ratio of the olefin-based resin:the reinforcing resin is usually in the range of about from 50:50 to 90:10. That is, when the amount of the reinforcing resin is excessively large, the strength reinforcing effect is excellent but the recyclability is low, and when the amount of the reinforcing resin is small, the strength reinforcing effect of this layer is impaired.

In addition, the strength reinforcing layer may have a layered structure in which a layer of an olefin-based resin and a layer of a reinforcing resin are layered. In such a layered structure, the thickness ratio of the olefin-based resin layer: the reinforcing resin layer is usually in a range of about from 1/1 to 3/1. That is, when the thickness of the reinforcing resin is excessively large, the recyclability of the packaging bag is largely lost, and when the amount of the reinforcing resin is small, the amount of oriented crystals present in the sealing portion is small, and there is a possibility that the improvement of the bag drop strength is insufficient.

The above-described olefin-based resins used for forming the strength reinforcing layer are preferably the same olefin-based resins as those used for forming the above-described thermoplastic resin film 1a, and polypropylene is the most suitable.

The polyamide to be blended with the above-described olefin-based resin is not particularly limited and may be exemplified by various ones, but in general, nylon 6, nylon 6,6, nylon 11, nylon 12, nylon 13, nylon 6/nylon 6,6 copolymer, aromatic nylon (for example, polymetaxylylene adipamide) and the like are preferably used.

The above-described strength reinforcing layer may be formed by co-extruding and stretch-molding a blend or by multilayer-extruding and stretch-molding a blend. Stretching may be performed in one or two axial directions.

The thickness of this strength reinforcing layer is not particularly limited, and may be appropriately set to the thickness of the thermoplastic resin film 1a which is set according to the volume and the like of the intended pouch. In general, the thickness is preferably 5 μm or more, and in particular preferably in the range of about from 5 to 30 μm.

The above-described various resins and polymers used for forming the thermoplastic resin film 1a and strength reinforcing layer may all have molecular weights sufficient to form a film.

When the strength reinforcing layer is formed between the adhesive layer 3 and the heat-sealing resin layer 5, the adhesive layer 3 is also provided between the strength reinforcing layer and the heat-sealing resin layer 5. That is, the layer structure of the layered body for packaging at this time is barrier film/adhesive layer/strength reinforcing layer/adhesive layer/heat-sealing resin layer.

Mode of Use of Layered body for Packaging

The above-described layered body for packaging of the present invention is used as a pouch (bag-like container) after being formed into a bag by bonding by heat sealing with the heat-sealing resin layer.

Bag making is performed by known means. For example, an empty pouch is produced by three-side sealing using two layered bodies, contents are filled from the opening portion, and finally the opening portion is closed by heat sealing.

In addition, it is also possible to produce an empty pouch by folding back a single layered body and heat-sealing both side edges. In this case, it is not necessary to heat seal the bottom portion. Furthermore, it is also possible to produce empty pouches using layered bodies only for side portions or bottom portions. Such a method is advantageous in increasing the volume of the pouch or providing a standing property.

The pouch thus produced from the layered body for packaging of the present invention and filled with contents has excellent oxygen barrier properties and is also excellent in terms of heat resistance and impact resistance, and even when subjected to sterilization treatment (retort treatment) with heated steam at 100 to 130° C., a decrease in oxygen barrier properties is effectively avoided and excellent oxygen barrier properties are maintained. Such pouches are therefore particularly well suited for containing foodstuffs.

In addition, in the above-described pouch, from the viewpoint of recyclability, it is preferable to adjust the types of various materials, the thicknesses of various layers, and the like so that the content of the olefin-based resin is 80% by mass or more.

EXAMPLES

The excellent effects of an embodiment of the present invention will be described in the following examples.

The following materials were used in the experiments below.

Sealant Film (Heat-Sealing Film)
   CPP Film-1;
     Torayfan ZK500 available from Toray Advanced Film Co., Ltd.
     Thickness: 70 μm
     Xylene-soluble fraction: 16.9% by mass
   CPP Film-2;
     Torayfan SH41E available from Toray Advanced Film Co., Ltd.
     Thickness: 70 μm
     Xylene-soluble fraction: 19.5% by mass
   CPP Film-3;
     Torayfan 3951 available from Toray Advanced Film Co., Ltd.
     Thickness: 70 μm
   LLDPE (Linear Low-Density Polyethylene) Film;
     TUXHZ available from Mitsui Chemicals Tohcello, Inc.
     Thickness: 70 μm Barrier Film
   Barrier oriented polypropylene film-1 (barrier film-1);
     Thickness: 20 μm
     Inorganic coating: a film in which a coating film mainly composed of silicon oxide is provided on a vapor-deposited film mainly composed of silicon oxide
   Barrier oriented polypropylene film-2 (barrier film-2)
     Thickness: 20 μm
     Inorganic coating: a film in which a coating film mainly composed of silicon oxide is provided on a vapor-deposited film mainly composed of aluminum oxide Other Films
   Oriented polypropylene film (OPP film);
     Bylen P2271 available from Toyobo Co., Ltd.
     Thickness: 20 μm Adhesive Layer
   Epoxy-based adhesive; Maxive available from Mitsubishi Gas Chemical Company, Inc.
     Coating liquid
        epoxy resin M-100/polyamine C-93T/mixed solvent=5.4/18.6/60
        mixed solvent: methanol/ethyl acetate=9/1
   Urethane-based adhesive A; available from Toyo Morton Co., Ltd.
     Coating liquid a
        polyester polyol/polyisocyanate/ethyl acetate=66/6.3/70
     Coating liquid b
        polyester polyol/polyisocyanate/ethyl acetate=34/17/55
   Urethane-based adhesive B: PASLIM available from DIC Corporation Coating liquid
  polyester polyol VM001/polyisocyanate VM108CP/ ethyl acetate=

The layer configuration, lamination, bag making and retort of the laminate film are as follows.

Layer Configuration

A two-layer structure laminated in a configuration of barrier film (barrier oriented polypropylene)/adhesive/sealant film and a three-layer structure laminated in a configuration of another film (oriented polypropylene)/barrier film/sealant film were produced.

Note that the adhesive is not included in the number of layers.

Laminate

Lamination was performed by a dry lamination method to obtain a layered body. The adhesive (coating liquid) was applied using a bar coater. The coating amount was about 4 g/m² in terms of solid content.

In the case of the two-layer structure, the inorganic coating surface was layered so as to face the sealant side. In order to use the barrier film as an intermediate layer in the three-layer structure, the surface other than the inorganic coating surface was subjected to corona discharge treatment to make the surface hydrophilic. In addition, the lamination was performed so that the inorganic coating surface faced the other film side. After the lamination, curing was performed at for 4 days.

Bag Making

The laminated film (layered body) was cut into two pieces of 140 mm×180 mm, filled with 200 g of water, and formed into a bag. An Impulse Sealer available from Fuji Impulse Co., Ltd. was used for sealing.

Sealing conditions: 180° C., 1.4 (s), and cooling 3.0 (s)
Seal width: 5 mm

Retort conditions
  121° C.×30-min shower

Various physical properties were evaluated by the following methods.

Measurement of Elastic Modulus of Adhesive Coating Film Alone
  Method of producing an adhesive coating film;
  Each coating liquid was produced and coated on a silicon plate to produce an adhesive coating film.
  Elastic modulus measurement method;
  The dynamic viscoelasticity was measured using a dynamic viscoelasticity measuring device available from Seiko Instruments Inc.
  Test specimen film: length of 5.0 mm and width of 10 mm
  Temperature range: from 20° C. to 150° C.
  Temperature increase rate: 3° C./min Frequency: 10 Hz
  The storage elastic modulus E' at 120° C. was evaluated.

Production of Layered Body of Barrier Film and Adhesive Layer and Evaluation of Thermal Shrinkage Ratio Producing an Adhesive-Layered Barrier Film;
  The coating liquid of the adhesive was applied to the vapor-deposited surface of the barrier film using a bar coater. The coating amount was about 4 g/m² in terms of solid content.

Measurement of Oxygen Permeability
  OX-TRAN2/22 available from MOCON, Inc. was used for measurement under the condition of 40° C. 90% RH.
  Each of the pouch before retort treatment and the pouch after retort treatment was cut out and measured.

Example 1

The coating film elastic modulus of the epoxy-based adhesive (Maxive) was measured.

Next, a coating liquid of an epoxy-based adhesive was applied to the vapor-deposited surface of the barrier stretched polypropylene film-1 (coating amount in terms of solid: about 4 g/m²), and a sealant film (CPP film-1) was laminated thereon by a dry lamination method to obtain a layered body having a two-layer structure.

After curing at 50° C. for 4 days, the layered body was used to make a pouch (filled with 200 g of water)(filled with 200 g of water), and then a retort treatment was performed. At this time, the oxygen permeability before and after the retort treatment was measured.

The experimental results are shown in Table 1.

Example 2

Using the same epoxy-based adhesive as in Example 1, a layered body having a three-layer structure formed of OPP film/adhesive/barrier film-1/adhesive/CPP film-1 was produced.

This layered body was used to make a pouch, a retort treatment was performed, and the oxygen permeability after the retort treatment was measured.

The experimental results are shown in Table 1.

Example 3

Using the same epoxy-based adhesive as in Example 1, a layered body having a three-layer structure formed of OPP film/adhesive/barrier film-1/adhesive/CPP film-2 was produced.

This layered body was used to make a pouch, a retort treatment was performed, and the oxygen permeability after the retort treatment was measured.

The experimental results are shown in Table 1.

Example 4

Using the same epoxy-based adhesive as in Example 1, a layered body having a three-layer structure formed of OPP film/adhesive/barrier film-1/adhesive/CPP film-3 was produced.

This layered body was used to make a pouch, a retort treatment was performed, and the oxygen permeability after the retort treatment was measured.

The experimental results are shown in Table 1.

Example 5

Using the same epoxy-based adhesive as in Example 1, a layered body having a three-layer structure formed of OPP film/adhesive/barrier film-1/adhesive/LLDPE film was produced. This layered body was used to make a pouch, a retort treatment was performed, and the oxygen permeability after the retort treatment was measured.

The experimental results are shown in Table 1.

Example 6

Using the same epoxy-based adhesive as in Example 1, a layered body having a two-layer structure formed of barrier film-2/adhesive/CPP film-1 was produced. This layered body was used to make a pouch, a retort treatment was performed, and the oxygen permeability after the retort treatment was measured.

The experimental results are shown in Table 1.

Comparative Example 1

The coating film elastic modulus obtained with the coating liquid a of the urethane-based adhesive A was measured.

In the same manner as in Example 1 except that the above-described adhesive was used, a layered body having a two-layer structure formed of barrier film-1/adhesive/CPP film-1 was produced, the layered body was used to make a pouch, a retort treatment was performed, and the oxygen permeability before and after the retort treatment was measured.

The experimental results are shown in Table 1.

Comparative Example 2

The coating film elastic modulus obtained with the urethane-based adhesive B was measured.

In the same manner as in Example 1 except that the above-described adhesive was used, a layered body having a two-layer structure formed of barrier film-1/adhesive/CPP film-1 was produced, the layered body was used to make a pouch, a retort treatment was performed, and the oxygen permeability before and after the retort treatment was measured.

The experimental results are shown in Table 1.

Comparative Example 3

The coating film elastic modulus obtained with the coating liquid b of the urethane-based adhesive A was measured.

In the same manner as in Example 1 except that the above-described adhesive was used, a layered body having a sealant film structure of a layer configuration formed of barrier film-1/adhesive/CPP film-1 was produced, the layered body was used to make a pouch, a retort treatment was performed, and the oxygen permeability before and after the retort treatment was measured.

The experimental results are shown in Table 1.

Comparative Example 4

Using the same adhesive as in Comparative Example 1, a layered body having a three-layer structure formed of OPP film/adhesive/barrier film-1/adhesive/CPP film-1 was produced. This layered body was used to make a pouch, a retort treatment was performed, and the oxygen permeability after the retort treatment was measured.

The experimental results are shown in Table 1.

Comparative Example 5

Using the same adhesive as in Comparative Example 1, a layered body having a three-layer structure formed of OPP film/adhesive/barrier film-1/adhesive/LLDPE film was produced. This layered body was used to make a pouch, a retort treatment was performed, and the oxygen permeability after the retort treatment was measured.

The experimental results are shown in Table 1.

Comparative Example 6

Using the same adhesive as in Comparative Example 1, a layered body having a two-layer structure composed of barrier film-2/adhesive/CPP film-1 was produced. This layered body was used to make a pouch, a retort treatment was performed, and the oxygen permeability after the retort treatment was measured.

The experimental results are shown in Table 1.

Note that, in Table 1, the meanings of abbreviations used for the layer configuration are as follows.

CPP1: CPP film-1
CPP2: CPP film-2
CPP3: CPP film-3
LLDPE: LLDPE film
BA1: Barrier film-1
BA2: Barrier film-2
OPP: OPP film (oriented polypropylene film)
AD: Adhesive

TABLE 1

|  | Layer configuration | Adhesive coating film elastic modulus (MPa) | Pre-retort oxygen permeability $cc/m^2/day/atm$ | Post-retort oxygen permeability $cc/m^2/day/atm$ |
| --- | --- | --- | --- | --- |
| Example 1 | BA1/AD/CPP1 | 57 | 0.05 | 1.8 |
| Example 2 | OPP/AD/BA1/AD/CPP1 | 57 | No data | 4.5 |
| Example 3 | OPP/AD/BA1/AD/CPP2 | 57 | No data | 3.3 |
| Example 4 | OPP/AD/BA1/AD/CPP3 | 57 | No data | 5.1 |
| Example 5 | OPP/AD/BA1/AD/LLDPE | 57 | No data | 23.3 |
| Example 6 | BA2/AD/CPP1 | 57 | No data | 1.2 |
| Comparative Example 1 | BA1/AD/CPP1 | 2.4 | 1.0 | 12.5 |
| Comparative Example 2 | BA1/AD/CPP1 | 1.3 | 0.29 | 14.9 |
| Comparative Example 3 | BA1AD/CPP1 | 39 | No data | 11.6 |
| Comparative Example 4 | OPP/AD/BA1/AD/CPP1 | 2.4 | No data | 11.1 |
| Comparative Example 5 | OPP/AD/BA1/AD/LLDPE | 2.4 | No data | 55.1 |
| Comparative Example 6 | BA2/AD/CPP1 | 2.4 | No data | 200 |

REFERENCE SIGNS LIST

1: Barrier film
1a: Thermoplastic resin film
1b: Inorganic coating
3: Adhesive Layer
5: Heat-sealing resin layer

The invention claimed is:
1. A layered body for packaging, comprising:
a barrier film having an inorganic coating formed on a surface of a thermoplastic resin film; and
an adhesive layer provided on the inorganic coating,
the layered body for packaging further comprising a heat-sealing resin layer and a strength reinforcing layer, wherein
the adhesive layer is formed of an epoxy-based adhesive,
the strength reinforcing layer is formed of a stretched film containing at least one selected from an olefin-based resin, a polyamide-based resin, and an ethylene-vinyl alcohol copolymer, and the layered body for packaging contains an olefin-based resin at a ratio of 80% by mass or more.

2. The layered body for packaging according to claim 1, wherein the thermoplastic resin film is an oriented polypropylene film.

3. The layered body for packaging according to claim 1, wherein the stretched film forming the strength reinforcing layer is formed of polypropylene.

4. The layered body for packaging according to claim 1, wherein the inorganic coating is a vapor-deposited film.

5. The layered body for packaging according to claim 1, wherein the strength reinforcing layer is a stretched film of a blend of an olefin-based resin and a polyamide-based resin or an ethylene-vinyl alcohol copolymer.

6. The layered body for packaging according to claim 1, wherein a storage elastic modulus of the adhesive layer is higher than 39 MPa at 120° C.

7. The layered body for packaging according to claim 6, wherein the epoxy-based adhesive contains an epoxy resin and an amine-based curing agent, and the adhesive layer is formed by curing the epoxy resin with the amine-based curing agent.

8. The layered body for packaging according to claim 7, wherein a heat-sealing resin layer is layered on the adhesive layer.

9. The layered body for packaging according to claim 8, wherein the heat-sealing resin layer is formed of a propylene-based resin composition, and the propylene-based resin composition contains an impact polypropylene component (A) in which an ethylene-propylene copolymer is dispersed in polypropylene and a linear low-density polyethylene (B).

10. The layered body for packaging according to claim 9, wherein the propylene-based resin composition has a xylene soluble fraction derived from the ethylene-propylene copolymer in a range of 8% by mass or more.

11. The layered body for packaging according to claim 9, wherein the linear low-density polyethylene (B) contains methylpentene as a copolymer.

12. A pouch obtained by bonding the layered body for packaging according to claim 8 by heat sealing.

13. The pouch according to claim 12, the pouch containing an olefin-based resin at a ratio of 80% by mass or more.

14. A layered body for packaging comprising a barrier film having an inorganic coating formed on a surface of a thermoplastic resin film in which an adhesive layer is provided on the inorganic coating,
the layered body for packaging further comprising a heat-sealing resin layer and a strength reinforcing layer, wherein
the adhesive layer has a storage elastic modulus higher than 39 MPa at 120° C.,
the strength reinforcing layer is formed of a stretched film containing at least one selected from an olefin-based resin, a polyamide-based resin, and an ethylene-vinyl alcohol copolymer, and
the layered body for packaging contains an olefin-based resin at a ratio of 80% by mass or more.

15. The layered body for packaging according to claim 14, wherein the strength reinforcing layer is a stretched film of a blend of an olefin-based resin and a polyamide-based resin or an ethylene-vinyl alcohol copolymer.

* * * * *